Sept. 13, 1932.    R. McCLARKEY ET AL    1,877,727
SAFETY SOLDER SUPPORTING HOLDER
Filed Dec. 14, 1931
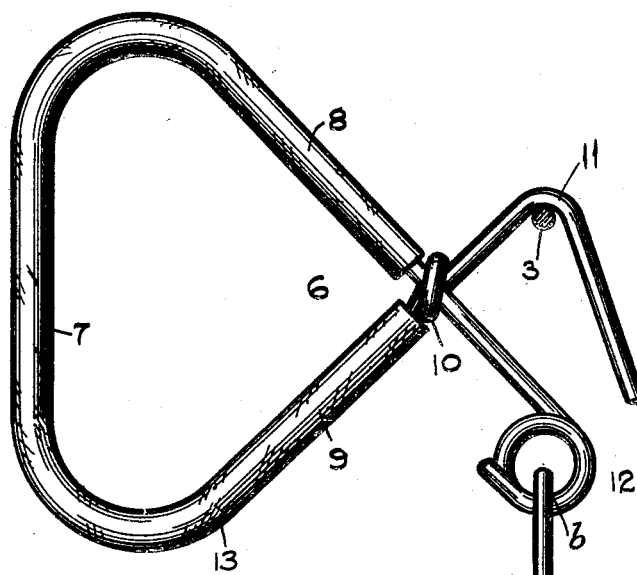
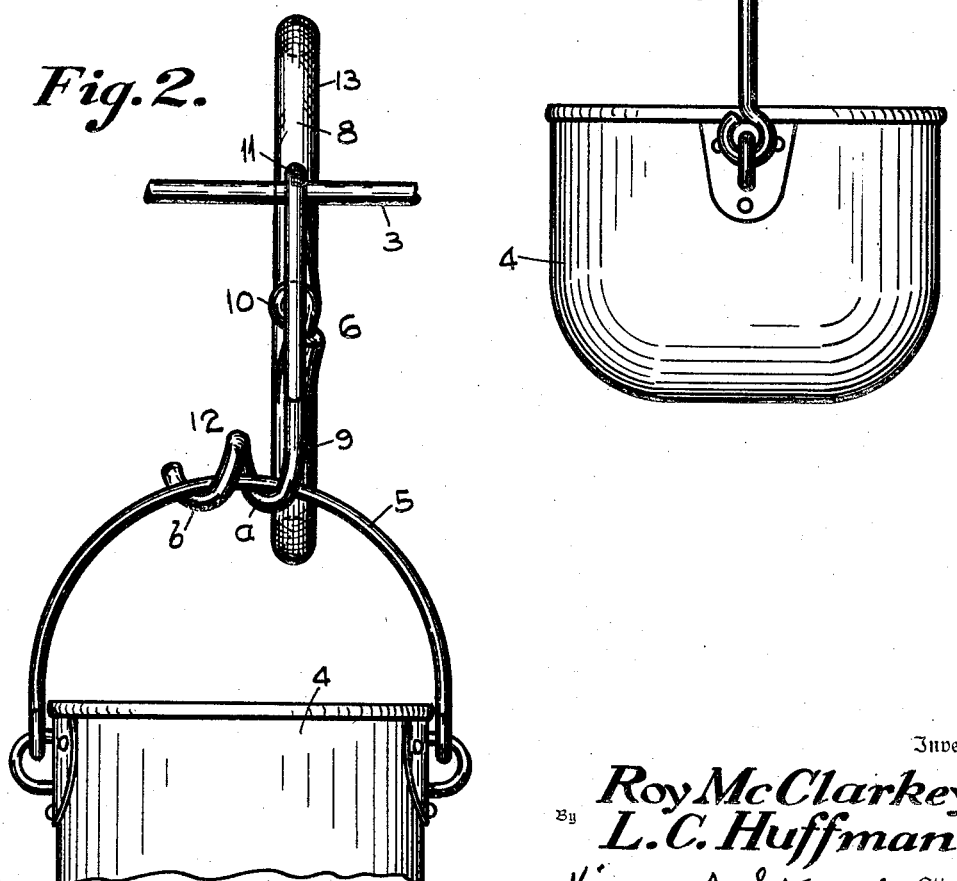
Inventors
Roy McClarkey
L. C. Huffman
By Hiram A. Sturgel  Attorney Patented Sept. 13, 1932

1,877,727

UNITED STATES PATENT OFFICE

ROY McCLARKEY AND LAURNEL C. HUFFMAN, OF VALLEY, NEBRASKA

SAFETY SOLDER-SUPPORTING HOLDER

Application filed December 14, 1931. Serial No. 581,036.

This invention relates to a safety holder, and more particularly to a holder for supporting bowls of melted solder used by linemen while repairing telephone and telegraph wires and their connections.

Since the wires mentioned are usually mounted on the heads or cross-bars of posts or poles and are disposed approximately six inches from each other it is obvious that the holder which supports the bowl of melted solder from one of the lines of wire, during operation, must be of limited proportions. Also the holder should be of such construction that it may be readily shifted from one line-wire to another, and will operate in a manner to prevent accidental detachment of the solder-bowl therefrom by action of the operator while making repairs or connections.

One of the objects is to provide a holder which will be provided with a spirally formed part for receiving the bail of the solder-bowl to prevent accidental detachment and to permit convenient mounting thereon of the bail of a soldering bowl.

Another object is to provide a holder for the bail which will prevent swinging movements of the soldering bowl relative to the holder.

Still another object is to provide a handle having a rectilinear part and to provide a pair of hooks which, during operation, will be disposed in a vertical plane parallel with the rectilinear part of the handle for maintaining the latter in a position to be conveniently grasped by an operator while shifting the device together with the soldering bowl from one line-wire to another.

With the above objects in view the invention presents a new and useful construction, combination and arrangement of parts as described herein and claimed, and as illustrated in the accompanying drawing, it being understood that changes may be made in form, size, proportions and minor details, said changes being within the scope of the invention as claimed.

In the drawing, Fig. 1 is a side view showing the holder mounted upon a line-wire supporting a soldering bowl, the wire being in section. Fig. 2 is a view of parts taken at right-angles to the view shown in Fig. 1.

Referring now to the drawing for a more particular description, the invention is shown in connection with a support or line-wire 3 and a load or soldering bowl 4, the latter being provided with a bail 5.

In order that the objects may be attained as first mentioned we provide a holder 6 approximately of triangular form consisting of a single metallic strip or strong wire bent to approximately a triangular form to provide a rectilinear handle 7 and a pair of arms 8 and 9 which converge toward and cross each other, the arm 9 being secured to the arm 8 by the formation of a winding or loop 10 thereon.

The arm 9 has an extension projecting beyond the loop 10 which is bent to form a hook 11, and the arm 8 has an extension which projects beyond said loop 10 which is bent to form a coil or spiral part 12 for receiving the bail 5 of the receptacle 4.

As best shown in Fig. 2, the coil or spiral part 12 projects outwardly from and is disposed at approximately right-angles to the handle 7 and arms 8 and 9 of the device.

As thus described it will be seen that when bail 5 of the soldering bowl or receptacle 4 has been placed on the coil 12 the handle 7 will be disposed vertically, and this is a desirable feature for convenience when shifting the device from one place to another.

Also it will be seen that the bail will be supported on two coils $a$ and $b$, and therefore any swinging movement in one direction of the soldering bowl will be prevented, this obviously being of advantage to prevent spilling of the contents of the bowl during the operation of making repairs.

In operation, for mounting the parts in operative position to be supported by the wire 3, the device is turned or swung in a well known manner to cause the loops $a$ and $b$ to receive the bail 5, and thereafter the hook 11, by use of the handle, is placed on the support or wire 3, said wire and coil 12 and bail 5, by action of gravity being normally disposed in a vertical plane, and the handle 7 disposed parallel with said vertical plane.

It will be appreciated that the arrangement of parts last mentioned is of great advantage since the work of repairing must be carried on among lines of wire at a considerable distance above the ground, the workmen standing upon ladders or similar portable supports, and by use of the holder as described the liability of accidental spilling of melted solder or personal injury from this source will be reduced to a minimum.

Numeral 13 indicates an electrical insulating jacket for covering the handle 7 and arms 8 and 9, and when the device is used in the presence of electrically charged wires which may be disposed in close proximity to each other, short circuits may be avoided since the handle might be moved into contact with a wire adjacent to the wire upon which the device is supported.

While the invention has been shown and described for use in electrical repair work for telephone and telegraph lines, it is obvious that the device could be used for other purposes, that is to say, the hook may engage a support other than the wire 3, and any other receptacle, weight or object to be supported may be substituted for the soldering bowl, and operation of parts would be practically the same as described.

We claim as our invention,—

1. In a receptacle holder for a mounting on a support, a metallic strip bent to provide a triangular part including a handle and a pair of intersecting arms each having a terminal part extending beyond its intersection, the terminal part of one arm being bent to provide a hook for engaging the support, the terminal part of the other arm being bent to a spiral form for a mounting thereon of said receptacle.

2. In a receptacle holder for a mounting on a support, a metallic strip bent adjacent to its ends to provide a handle and a pair of intersecting and connected arms disposed approximately at right-angles to each other, one arm having a terminal part bent to provide a hook for a mounting on the support, the other arm having a terminal part bent to a spiral form for a mounting thereon of said receptacle.

3. In a receptacle holder for a mounting on a support, a metallic strip bent to provide a handle, an arm having a hook for engaging the support, a second arm intersecting the first named arm and having a spirally formed terminal extending transversely therefrom for supporting the receptacle, and means for connecting the arms one with the other at their intersecting parts.

4. In a receptacle for a mounting on a support, a metallic strip bent to provide a rectilinear handle, an arm having a hook for normally engaging the support, and a second arm extending across and secured to the first named arm and having a spirally formed terminal normally disposed below the hook in the vertical plane of the support and said hook, said plane being parallel with said handle.

5. In a receptacle holder for a mounting on a support, a metallic strip bent inwardly from its ends to a triangular form including a handle and a pair of intersecting arms, one arm being provided with a terminal hook for engaging the support, the other arm having a spirally formed terminal part for a mounting thereon of a receptacle, means for connecting said arms at their intersecting parts, and an electrical insulating jacket on said handle.

In testimony whereof, we affix our signatures.

ROY McCLARKEY.
LAURNEL C. HUFFMAN.